(12) United States Patent
Xie et al.

(10) Patent No.: US 10,104,121 B2
(45) Date of Patent: Oct. 16, 2018

(54) APPLICATION LAYER-BASED SINGLE SIGN ON (71) Applicant: Fortinet, Inc., Sunnyvale, CA (US)

(72) Inventors: Michael Xie, Palo Alto, CA (US); Wei David Wang, North Vancouver (CA); Ihab Khalil, Port Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 965 days.

(21) Appl. No.: 13/935,378

(22) Filed: Jul. 3, 2013

(65) Prior Publication Data

US 2015/0012964 A1   Jan. 8, 2015

(51) Int. Cl.
*H04L 29/06* (2006.01)

(52) U.S. Cl.
CPC .......... *H04L 63/20* (2013.01); *H04L 63/0281* (2013.01); *H04L 63/0815* (2013.01); *H04L 63/104* (2013.01); *H04L 63/168* (2013.01)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS

2013/0298209 A1\* 11/2013 Targali et al. .................... 726/6
2014/0137188 A1\* 5/2014 Bartholomay et al. ........... 726/3

\* cited by examiner

*Primary Examiner* — Sharif E Ullah
(74) *Attorney, Agent, or Firm* — Hamilton, DeSanctis & Cha LLP (57) ABSTRACT

Methods and systems are provided for implementing application layer security. According to one embodiment, an application layer packet is received by a network appliance and one or more information fields, selected based on an application type associated with the packet, are used to identify an associated end user. Then, security rules that match the traffic pattern, traffic content and identified end user can be applied to the packet. Identification of end users based on application layer information allows different security rules to be implemented for end users or groups thereof. Application of security rules based on identification of an end user based on application layer information can also facilitate implementation of an application-layer-based single sign-on (SSO) process.

20 Claims, 6 Drawing Sheets

APPLICATION LAYER-BASED SINGLE SIGN ON

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013, Fortinet, Inc.

BACKGROUND

Field

Embodiments of the present invention generally relate to the field of computer networks. In particular, systems and methods of the present disclosure relate to implementation of application layer security by identifying end users and implementing security rules based on application layer information.

Description of the Related Art

With users becoming more active on the Internet, concerns relating to network security have grown significantly, not only from traffic originating from outside an enterprise network, but also for traffic originating from within an organization's network. Multiple network appliances, such as routers, firewalls, network intrusion detection systems, among other access control mechanisms, have been implemented to determine the type and characteristics of traffic that are valid and allowed to be forwarded into or out of a protected network. Network appliances are configured to define and use one or more security rules that indicate actions to be performed by the network appliance when network packets are received by them, wherein each security rule can include a matching criteria, which when met, specifies a desired action to be performed. For instance, a security rule can be: "every week day, after 7 PM to 6 AM" all traffic from external interfaces to internal interfaces should be handled in a particular manner (e.g., blocked, disallowed or dropped). Security rules therefore define actions (such as block, allow or other advanced operations, such as scan traffic or bypass traffic) to be performed when corresponding criteria are met.

Most existing network appliances define security rules based on network layer (layer 3) information, such as source Internet Protocol (IP) address, destination IP address, source port, destination port, among other such information, wherein such security rules are configured to allow, block, rate limit, or perform any other defined function on received packets. Some network appliances also implement security rules based on an application type with which the received packet is associated. Such security rules are limited in that they lack user-level granularity, thereby not providing customized security rule settings that can distinguish among end users of an organization, for instance. While there are network security appliances that provide extraordinary flexibility by allowing scripts to be written for processing packets, the price of this flexibility is increased complexity and burden on the network administrator. Therefore, there is a need for systems and methods that allow for implementation of application layer security based on end users and permit the end users to achieve single sign on for network transactions.

SUMMARY

Methods and systems are provided for implementing application layer security. In one embodiment, end users may be identified based on application layer information within received packets, and new or existing security rules based on identified end users and/or other parameters of interest may be employed to handle such packets. Customized end-user based application layer security can therefore be implemented that allows flexibility in defining security rules and ease in packet handling. The application layer security mechanisms described herein can also be used within an enterprise to limit or authorize access to network resources, for example.

According to one embodiment, systems and methods are provided for identifying end users and a type of application being run by a client device used by such end users based on application layer information contained within packets originated by the client device. Appropriate security rules at a user or group-level can then be applied based on the type of application and the identity of the end user. Application layer packets are received and one or more information fields in each packet are used to identify an associated end user. Then, security rules that match the traffic pattern, traffic content and identified end user can be applied to the packets. Identification of end users based on application layer information allows different security rules to be implemented for end users or groups thereof. Application of security rules based on identification of an end user based on application layer information can also facilitate implementation of an application-layer-based single sign-on (SSO) process.

According to one embodiment, system of the present invention comprises an application type detection module, application field retrieval module, end user identification module, security rule identification module, and security policy implementation module. According to one embodiment, application type detection module is configured to receive an application layer packet and determine an application type with which the application layer packet is associated. For a set of packets that form part of a traffic, application type detection module can also be configured to determine the application type of the traffic, such as but not limited to whether the traffic is of HTTP, SIP, SMTP, RTP, SQL, SSH, FTP, SMTP, HTTPS, SFTP, SSL, TLS, POP, or any other application type.

According to an embodiment, application field retrieval module configured to retrieve one or more information fields based on the application type, wherein the retrieved information fields are indicative of an end user with which the application layer packet is associated. In an implementation, application field retrieval module can be configured to analyze each application layer packet and retrieve application information such as one or more application fields from the packet, which can help identify the end user of the packet. In an instance, each packet of HTTP application type includes an information field XFF ("X-Forwarding For") that indicates the IP address of the end user. Similarly, each packet of SIP application type includes an information field SIP address, which indicates the IP address of the end user. Similarly, analysis of each packet, based on its respective application type, can help in getting access to the end user of the packet.

End user identification module can be configured to determine identity of the end user based on the retrieved information fields. As mentioned above, based on specific information fields such as XFF, SIP address, identity (such as IP address) of the end user can be determined. According to one embodiment, security rule identification module is configured to identify one or more applicable security rules based on the determined application type and identity of the end user. Multiple other parameters such as traffic characteristics, timestamp, and network level packet details, among others can also be incorporated to identify the applicable security rules. In an embodiment, a security rule database can be configured in the present system, wherein the database can include multiple security rules that are applicable to different application types, such that for a given application type, relevant security rules can be identified and extracted by the security rule identification module based on the identity of the end user.

According to another embodiment, security policy implementation module is configured to apply one or more applicable security rules to the application layer packet as a security policy in order to implement the policy on the packet/traffic. Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Embodiments of the present invention generally relate to methods and systems for implementing application layer security. In one embodiment, end users may be identified based on application layer information within received packets and new or existing security rules based on end users and/or other parameters of interest may be employed to handle such packets.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the invention in an exemplary manner and any other purpose or function for which the explained structure or configuration can be used, is covered within the scope of the present disclosure.

Figure 1:
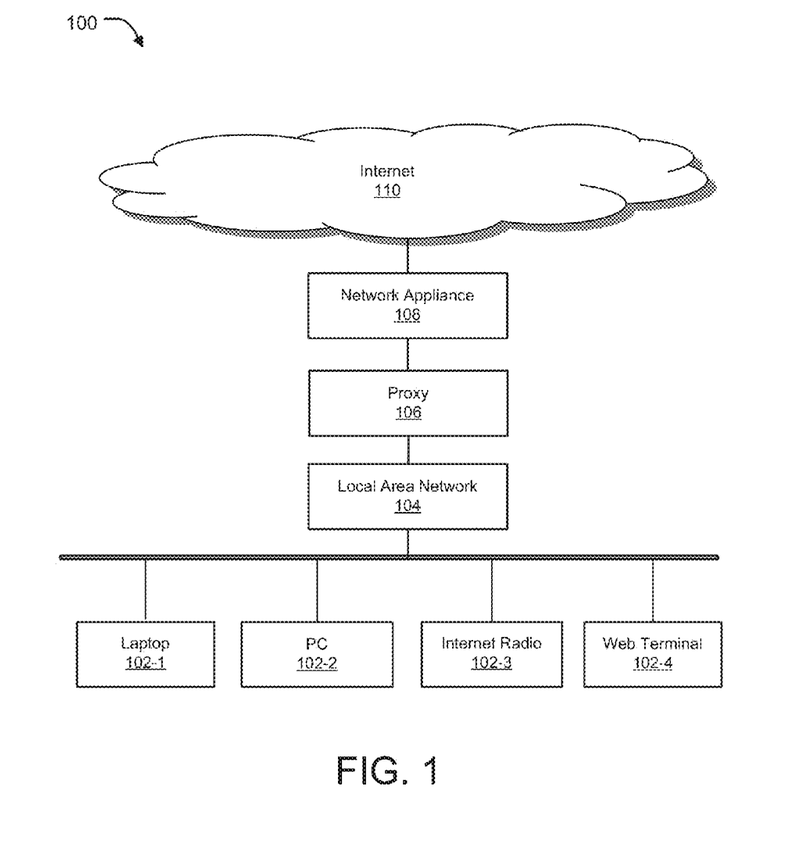
FIG. 1 illustrates an exemplary network architecture in accordance with an embodiment of the present invention.

Embodiments of present disclosure and their advantages can be understood by reference to FIG. 1.

FIG. 1 illustrates an exemplary network architecture 100 conceptually showing a network environment in which a single sign-on service and flow of network traffic packets may take place. As shown in FIG. 1, network architecture 100 comprises one or more computing devices such as Laptop 102-1, PC 102-2, Internet Radio 102-3, Web Terminal 102-4, . . . , 102-n, collectively referred to as computing device(s) 102 hereinafter, which are operatively coupled to each other through a Local Area Network (LAN) 104. LAN 104 can be configured to connect one or more computing devices 102 to Internet 110 by means of a network appliance 108. Network appliance 108 can include one or more of a switch, router, hub, gateway device, firewall, among other such networking devices, or combinations thereof, that enable access to Internet 110. According to one embodiment, network appliance 108 separates the external computing environment, represented by Internet 110 from the internal computing environment represented by computing devices 102. Network appliance 108 can be configured to apply security rules to packets exchanged within the internal network and between the internal and external networks. For example, packets may be filtered, classified and/or evaluated in order to determine whether the packet should allowed, blocked, or any other desired action should to be taken to handle the packet. According to one embodiment, appliance 108 can be operatively coupled to or can incorporate a security rules database (not shown) that comprises rules and setting for processing and scanning a packet for determination of an appropriate action thereon.

According to one embodiment, as illustrated in FIG. 1, LAN 104 can be operatively coupled with a network appliance 108 through a proxy 106. Proxy 106 may be a virtual or physical device and may be incorporated within network appliance 108 or may be implemented separately. In one embodiment, proxy 106 is configured to implement a single sign-on (SSO) for multiple users such that, once configured, the proxy 106 manages login idiosyncrasies of the applications that the users want to access. Further, SSO provides access control that allows a user to login once to the proxy 106, using HyperText Transfer Protocol (HTTP) or other appropriate protocol, and then gain access to one or more gateways, servers or other such entities, without logging in again. Single sign-on (S SO) bypasses the normal user authentication process and instead trusts that the proxy 106 has authenticated the user. Proxy 106 not only comprises login information of users to facilitate managing sessions and access rights, but can also act as a central network and security manager for implementing network policies. According to one embodiment, as proxy 106 is configured to authenticate each user, proxy 106 can also be configured to apply security rules for each user based on login and user characteristics.

According to one embodiment, network appliance 108 can be configured to receive an application layer packet (e.g., process application layer (layer 7) information associated with a packet) and determine an application type with which the application layer packet is associated. Based on the application type, one or more information fields can be retrieved/extracted from the application layer information contained within the packet. In one embodiment, the information fields retrieved/extracted are individually or collectively indicative of an identity of an end user with which the application layer packet is associated. Network appliance 108 can further be configured to determine the identity of the end user based on the retrieved information fields and then use a security rule database, which is operatively connected thereto, to identify one or more applicable security rules based on the determined application type and the identity of the end user. According to another embodiment, network appliance 108 can further be configured to apply the one or more applicable security rules, retrieved from the security rule database, to the application layer packet.

Figure 2:
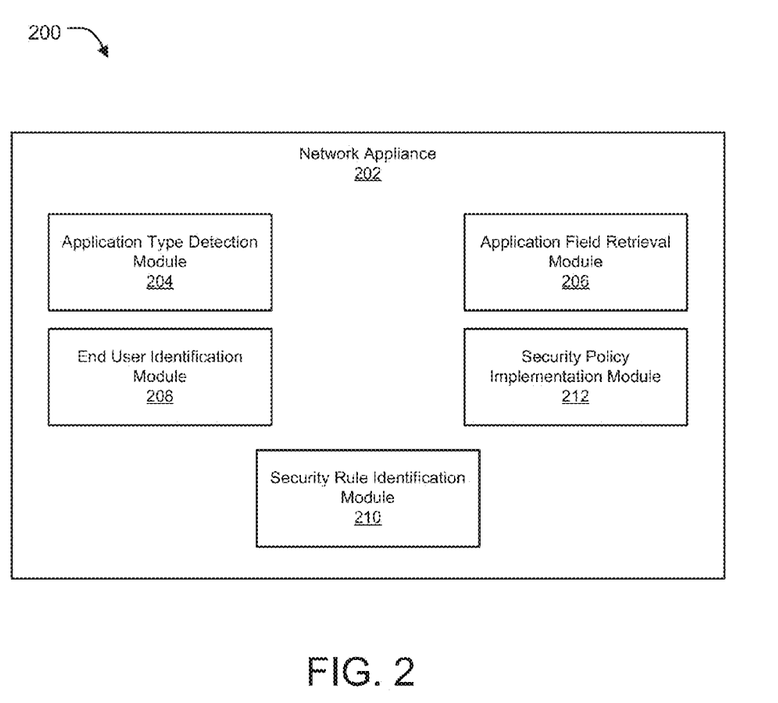
FIG. 2 illustrates exemplary modules for implementing application layer security in accordance with an embodiment of the present invention.

FIG. 2 illustrates exemplary functional modules of a network appliance 202 for implementing application layer security in a system 200 in accordance with an embodiment of the present invention. It should be appreciated that while the present example is described with reference to specific exemplary functional modules, more or fewer modules can be used depending upon the particular implementation. Furthermore, while in the context of the present example, the exemplary functional modules are described as if they are embodied within network appliance 202, one or more of the functional modules may be implemented within and/or stored in another device/system (e.g., proxy 106) that is coupled in communication with network appliance 202.

In the present example, network appliance 202 comprises an application type detection module 204, an application field retrieval module 206, an end user identification module 208, a security rule identification module 210 and a security policy implementation module 212. Network appliance 202 can be implemented using one or more processors for being operational over a network, wherein the one or more processors can be configured to implement the components of system 200. Moreover, the network appliance 202 may be wired, wireless, or a combination of wired and wireless.

According to one embodiment, application type detection module 204 is configured to receive an application layer packet and determine an application type with which the application layer packet is associated. As those skilled in the art will appreciate, there are numerous ways of determining an application type of a packet. For example, the application type can be determined based on the port for which the packet is meant (port scanning), type of protocol being used, pattern of data packets, signature matching, among other parameters. Common application types include HyperText Transfer Protocol (HTTP), Session Initiation Protocol (SIP), Simple Mail Transfer Protocol (SMTP), Real-time Transport Protocol (RTP), Structured Query Language (SQL), Real-Time Publish-Subscribe Protocol (RTPS), Secure Shell protocol (SSH), File transfer Protocol (FTP), Simple Mail Transfer Protocol (SMTP), HTTPS, Secure File Transfer Protocol (SFTP), Secure Sockets Layer (SSL), Transport Layer Security (TLS), Session Layer protocols (SLP), Presentation Layer protocols (PLP), Post Office Protocol (POP), Advanced Program-to-Program Communication (APPC), Advanced Message Queuing Protocol (AMQP), Coherent File Distribution Protocol (CFDP), Constrained Application Protocol (CoAP), Data Distribution Service (DDS), Endpoint Handle space Redundancy Protocol (ENRP), User Information Protocol (UIP), File Transfer Access and Management (FTAM), Packet-Based Multimedia Communications System (H.323), Internet Relay Chat Protocol (IRCP), Lightweight Directory Access Protocol (LDAP), Line Printer Daemon Protocol (LPD), Multipurpose Internet Mail Extensions (MIME), Secure/Multipurpose Internet Mail Extensions (S/MIME), Network File System (NFS), Network Information Service (NIS), Network News Transfer Protocol (NNTP), National Transportation Communications for Intelligent Transportation System Protocol (NTCIP), Network Time Protocol (NTP), Peer Name Resolution Protocol (PNRP), Remote Desktop Protocol (RDP), Reliable Event Logging Protocol (RELP), Routing Information Protocol (RIP), Remote Login in UNIX Systems (Rlogin), Remote Procedure Call (RPC), Real Time Messaging Protocol (RTMP), Real Time Publish Subscribe (RTPS), Real Time Streaming Protocol (RTSP), Session Announcement Protocol (SAP), Session Description Protocol (SDP), Session Initiation Protocol (SIP), Service Location Protocol (SLP), Server Message Block (SMB), Simple Network Time Protocol (SNTP), Secure SMS Messaging Protocol (SSMS), Transaction Capabilities Application Part (TCAP), Tabular Data Stream (TDS), Time Stamp Protocol (TSP), Virtual Terminal Protocol (VTP), Remote Directory Access Protocol, Message Handling Service Protocol, Directory Access Protocol (DAP), and Extensible Messaging and Presence Protocol (XMPP). It should be appreciated that any other application type not mentioned above is also completely within the scope of the present disclosure.

According to an embodiment, application field retrieval module 206 is configured to extract the value of one or more information fields from the application layer information contained in the packet based on the application type determined by module 204. The retrieved/extracted information field values can individually or collectively be indicative of an end user with which the application layer packet is associated. The retrieved information fields can include, but are not limited to, one or more of X-Forwarded-For (XFF), X-Forwarded-Proto, Front-End-HTTPs, X-Wap-Profile, X-Requested-With, SIP address, and X-Remote-Address. For instance, X-Forwarded-For (XFF) header field is a standard for identifying the originating IP address of a client connecting to a web server through an HTTP proxy or a load balancer. Any network packet of HTTP application type would therefore contain an XFF header field, which can help identify the end user details of the network packet based on the originating IP address of the client connecting to the Internet through an HTTP proxy or load balancer, for example. Similarly, for packets having SIP as the application type, SIP address information field can indicate the IP address of the packet.

According to an embodiment, end user identification module 208 is configured to determine the identity of the end user (e.g., an IP address of the client device, a user name or the like) based on retrieved information fields from the application layer. The XFF HTTP header field of an HTTP application-type packet can, for instance, indicate the IP address of the client device being used by the end-user. According to another embodiment, apart from the end-user identity, module 208 can also be configured to identify further details and characteristics of the end user and also of the packet in question. In the event that the network appliance works with a proxy, module 208 can further be configured to determine the trustworthiness of the proxy in indicating the correct originating IP address and not acting as an anonymizing service. In one embodiment, therefore, Module 208 tries to identify the correct and actual IP address of the client device that originated the packet in question by retrieving appropriate information fields/headers from the application layer information contained within the packet.

According to an embodiment, security rule identification module 210 is configured to identify one or more applicable security rules based on the determined application type and the identity of the end user. According to one embodiment, all or part of the security rules can be stored in a security rule database that resides within or is operatively coupled with network appliance 202, wherein, based on the application type detected by application type detection module 204 and end user identity information determined by end user identification module 208, the database can be queried to identify applicable security rules. According to another embodiment, instead of selecting one or more applicable security rules, security rule identification module 210 can further be configured to design or update existing security rules so as to implement the most suitable and desired rules for the end user in question. Security rules can therefore be customized as per the needs, requirements and security threat levels, which, when implemented, can either block, allow or perform any other desired action on the packet such that the user's access to network service is limited by the defined security rules.

According to one embodiment, a security policy implementation module 212 is configured to apply the one or more applicable security rules to the application layer packet. According to one embodiment, even for a given end user, the same or a different set of security rules can be implemented depending upon the context of the packet and other traffic characteristics. Implementation of security rules can include blocking of a certain IP address or a range of IP addresses, which are predatory to the system, or allow certain specific domain names to access systems/servers, or allow access to only some specified types of domain names or domain name extension like .edu or .mil etc.

Single sign-on (SSO) can take many forms, but a preferred architecture is for a user to authenticate to a centrally managed system, and for applications to trust the central system for identity information about the user rather than re-authenticating the user. SSO is mechanism whereby a single action of user authentication and authorization can permit a user to access a set of computers, systems, resources and/or applications, without the need to enter multiple passwords. As SSO is typically implemented using a proxy, configuration of network appliance 202 with an SSO implemented proxy can help define applicable security rules for end users for each packet incoming through the proxy.

Figure 3:
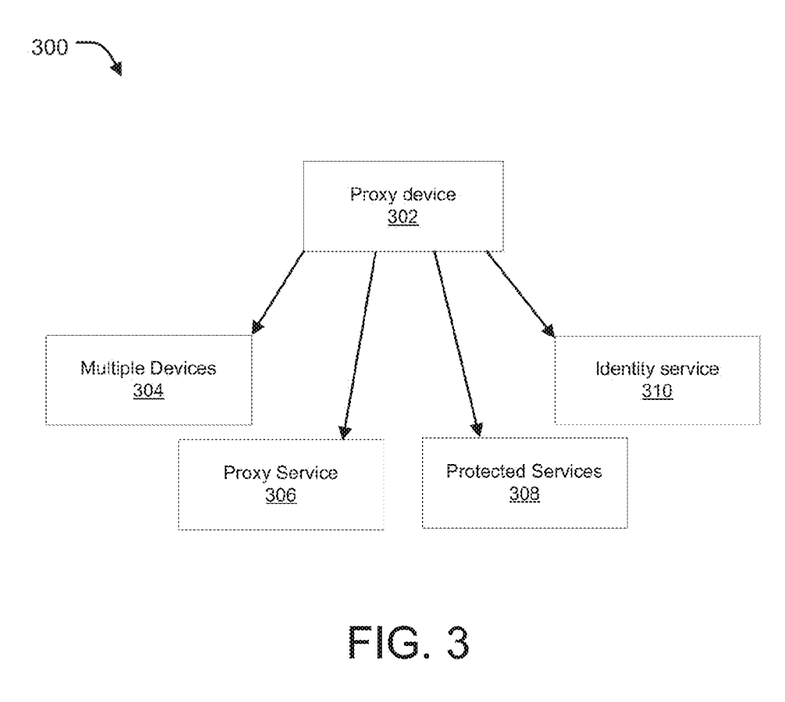
FIG. 3 illustrates a proxy environment for implementing application layer-based single sign-on in accordance with an embodiment of the present invention.

FIG. 3 illustrates a proxy environment 300 for implementing application layer-based single sign-on in accordance with an embodiment of the present invention. In one embodiment a SSO process can be implemented in a machine-accessible and a non-transitory computer-readable storage medium in the form of instructions, which can be executed by one or more processors within a network, for instance. The one or more processors can be configured to implement the various components of the SSO system, wherein the system implements, among other functions, a single authentication service.

According to one embodiment, the SSO process can be implemented on a proxy device 302, which may be a network appliance in accordance with the above description. Proxy device 302 can be operatively coupled with multiple end-user devices 304, and further configured to run a proxy service 306 on devices 304. Proxy device 302 can be a gateway, a forward proxy, a transparent proxy, a reverse proxy, among other known devices, and can be logically and/or physically interposed between devices 304 and protected services 308 to require that users of all devices 304 authenticate themselves with the proxy device 302 before having access to protected services 308. In one embodiment, proxy device 302 manages the devices 304 by enabling SSO capabilities and controls access to protected services 308.

According to one embodiment, proxy service 306 can be implemented and can reside in a non-transitory computer-readable medium and may execute on the proxy device 302. According to one embodiment, proxy service 306 can be configured to manage multiple devices 304 as a single environment or as one or more logical entities. Furthermore, proxy service 306 can be configured to allow authentication of multiple devices 304 of the single environment to take place once and allow the devices 304 to be a part of the session thereafter without requiring re-authorization. According to another embodiment, proxy service 306 can be further configured to manage a configuration file for the single environment having the IP address and/or DNS names for each of the multiple devices 304 and an environment identifier application type such as X-Forwarded-For (XFF), X-Forwarded-Proto, Front-End-HTTPs, X-Wap-Profile, X-Requested-With, and/or X-Remote-Address etc. for the single environment.

According to another embodiment, proxy service 306 can also be configured to establish multiple communication sessions between one or more of devices 304 and protected resources/services 308. For instance, proxy service 306 can be configured to selectively and dynamically establish communication sessions between each of the multiple devices 304 and the protected services 308 once an authenticated principal attempts to access the protected resources 308 from each of the multiple devices 304. According to an embodiment, SSO system 300 can include an identity service 310, wherein the service 310 can be implemented on the proxy device 302 and can be configured to interact with the proxy service 306 to authenticate principals for the SSO to the single environment. Identity service 310 can further provide implementation of security rules for the SSO service and decide whether a principal is to be granted access to the protected resources/services 308.

Figure 4:
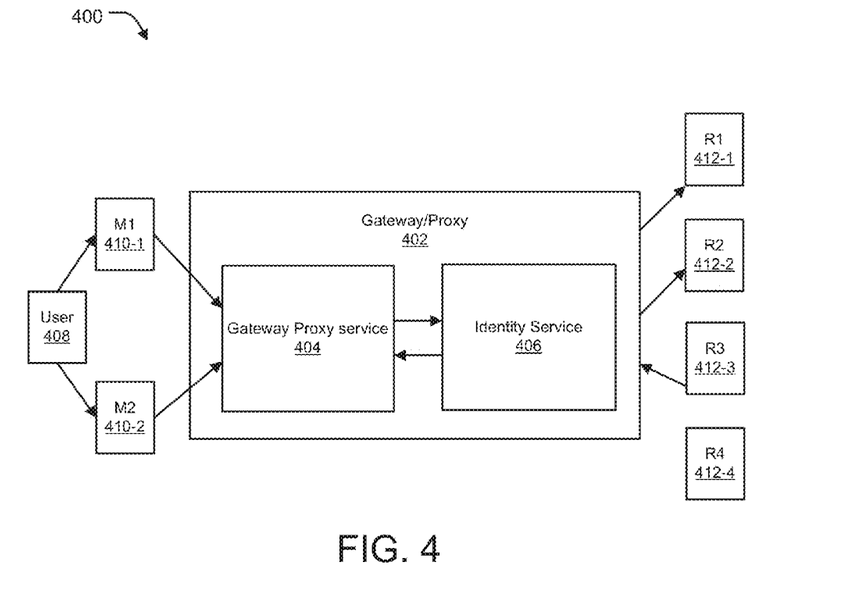
FIG. 4 illustrates an exemplary architecture and a component interaction diagram for an application-layer based single sign on system in accordance with an embodiment of the present invention.

FIG. 4 is an exemplary architecture and component interaction diagram for an exemplary SSO system 400 in accordance with an embodiment of the present invention. Architecture of system 400 can be used to implement various possible forms of methods and systems described herein. It is to be understood that architecture illustrated by FIG. 4 is merely exemplary and not intended to be limiting.

FIG. 4 illustrates a user 408 operatively coupled with two machines M1 410-1 and M2 410-2. System 400 further illustrates four protected resources R1 412-1, R2 412-2, R3 412-3 and R4 412-4 that are operatively coupled with and accessible to machines 410 and user 408 through a gateway/proxy 402. It is to be noted that even though the present illustration is described with reference to two machines and four protected resources, any number of machines or resources can be accommodated depending upon the particular implementation.

According to one embodiment, resources 412 are accessible via the Internet, and machines 410 form part of an internal network that make use of such resources 412 after authentication by proxy 402. According to another embodiment, gateway/proxy 402 includes a gateway proxy service 404 that is configured to store a configuration file containing specific information about the environment of the present system. Configuration file can be manually generated beforehand and installed on the gateway/proxy 402 or can be automatically and dynamically generated by a utility having a user interface. Configuration file can include either the Domain Name System (DNS) name or an Internet Protocol (IP) address for every machine 410 in each environment along with associated environment identification (ID).

In an implementation, user 408, through machine M2 410-2, wishes to access protected resource R2 412-2. A request for this resource can be made through the gateway/proxy 402, wherein, once the proxy 402 receives the request, the gateway/proxy service 404 can parse the configuration file and store the parsed data within a file for local access on the gateway/proxy 402. Service 404 on the gateway/proxy 402 can then search for an associated session, which would not exist if the user 408 has not been authenticated with the proxy 402. Data from the configuration file can then be searched for application fields such as XFF field, through which the IP address or DNS name of machine M2 410-2 can be retrieved and matched and implemented with the identified/applicable security rules. If the IP address or DNS name of machine M2 410-2 is found and matches with the identified security rules, it is interpreted that the machine is in the proxy environment and a session needed is then created for each machine in that environment. According to one embodiment, in case a machine 410 has not been authenticated by proxy 402, service 404 of the gateway/proxy 402 can redirect the machine 410 to authenticate through an Identity Service 406, which can be configured to parse the IP address of the machine 410 along with evaluation of other characteristics of the user 408 and make the user (including machines 410 associated thereto) a part of the environment.

According to an embodiment, during the authentication process of the identity service 406, user 408 can enter authentication credentials, which if accepted, can create a session for each of the machine in the environment. According to another embodiment, when a user 408 accesses a protected resource from another machine, a session could be created on the fly (dynamically and real time); and therefore new sessions are only created when they are needed (as needed basis).

Figure 5:
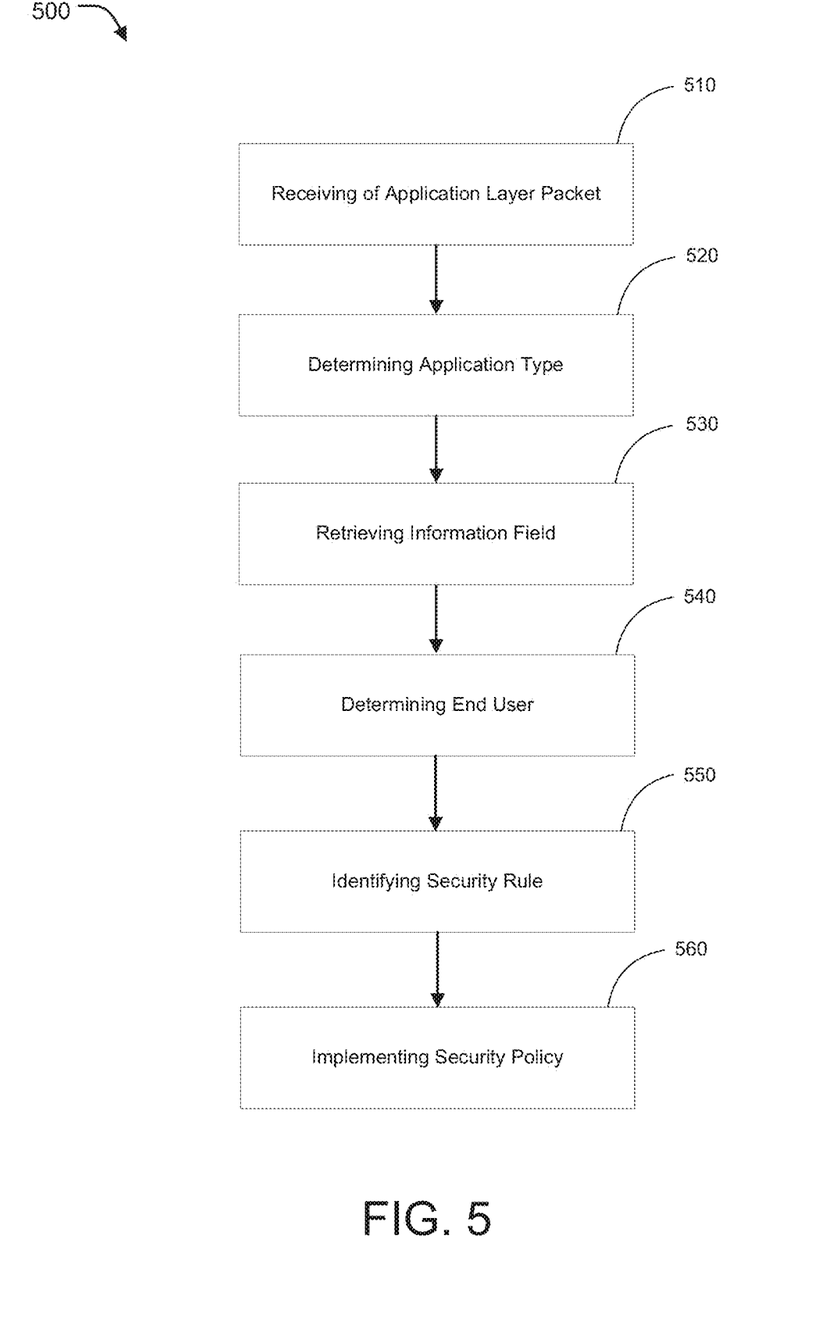
FIG. 5 illustrates a flowchart for application layer security processing in accordance with an embodiment of the present invention.

FIG. 5 illustrates a method 500 for implementing application layer security processing in accordance with an embodiment of the present invention. At block 510, a network appliance (e.g., network appliance 108) receives an application layer packet. The application layer packet can be a packet originated by an application running on a client device (e.g., laptop 102-1) being used by a user of an internal network (e.g., LAN 104) that is coupled to the network appliance by means of a proxy (e.g., proxy 106) as a single sign-on process. At block 520, the network appliance determines an application type with which the application layer packet is associated. At block 530, network appliance retrieves one or more information fields that are indicative of an end user with which the application layer packet is associated. Retrieved information fields can include, but are not limited to, one or more of X-Forwarded-For (XFF), X-Forwarded-Proto, Front-End-HTTPs, X-Wap-Profile, X-Requested-With, and/or X-Remote-Address fields.

At block 540, the network appliance determines the identity of the user based on the retrieved information fields, wherein the user can be identified by the source IP address of the client device, domain name, port name, among other attributes. In an implementation, network appliance can be configured with a proxy in case of an SSO session, wherein the proxy includes a list of all IP address of machines that have been authenticated thereby. At block 550, the network appliance identifies one or more applicable security rules based on the determined application type and the identity of the end user. Applicable security rules can be customized as per end users needs, requirements, or threat levels and can be stored in a security rule database.

At block 560, the network appliance applies the applicable security rules to the application layer packet such that the packet is transmitted, blocked, or configured to perform in any other desired manner.

Figure 6:
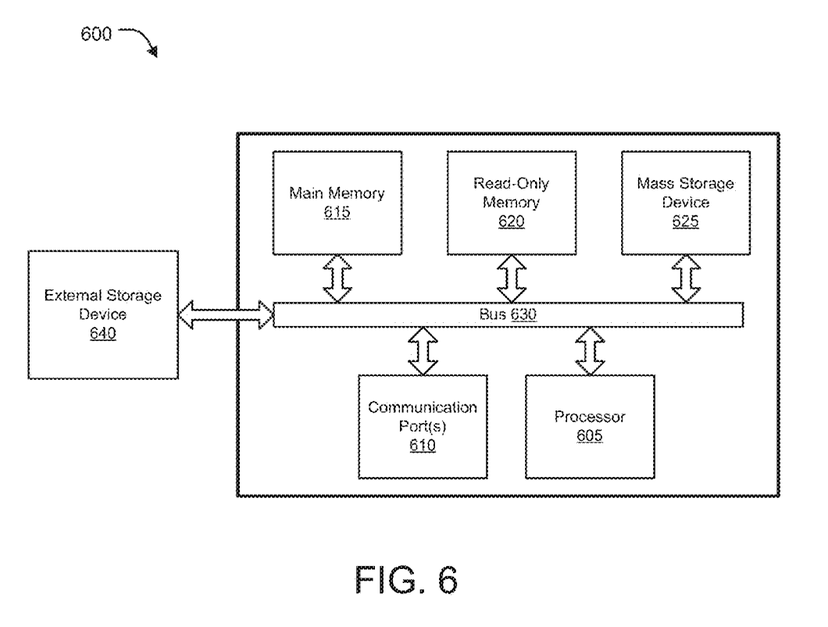
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a network device (e.g., network appliance 108 or proxy 106) or other network security device, a server or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Xeon® or Itanium® processor(s), or AMD®, Opteron® or Athlon MP® processor(s), Motorola® lines of processors, FortiSOC™ system on a chip processors or other future processors. Processor 605 may include various modules associated with messaging security gateway 200 as described with reference to FIG. 2. For example, processor 605 may include one or more of mail reception module 202, domain name validation module 204, validity update module 206 and send/discard module 208.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A system for implementing application layer security comprising:
    one or more processors; and
    a memory coupled to the one or more processors and having stored therein:
        an application type detection module configured to receive an application layer packet originated within a network of an enterprise and determine an application type with which the application layer packet is associated;
        an application field retrieval module configured to retrieve one or more information fields from application layer information contained within the application layer packet based on the application type, wherein the retrieved information fields are indicative of an end user of the enterprise with which the application layer packet is associated;
        an end user identification module configured to determine the identity of the end user based on the retrieved information fields;
        a security rule identification module configured to identify one or more applicable security rules based on the determined application type and the identity of the end user; and
        a security policy implementation module configured to apply the one or more applicable security rules to the application layer packet.

2. The system of claim 1, wherein a plurality of security rules from which the one or more applicable security rules are selected are stored in a database, and wherein the database is operatively coupled with said security rule extraction module.

3. The system of claim 1, wherein the application type comprises one or more of HyperText Transfer Protocol (HTTP), Session Initiation Protocol (SIP), Simple Mail Transfer Protocol (SMTP), Real-time Transport Protocol (RTP), Structured Query Language (SQL), Real-Time Publish-Subscribe Protocol (RTPS), Secure Shell protocol (SSH), File transfer Protocol (FTP), Simple Mail Transfer Protocol (SMTP) , HTTPS, Secure File Transfer Protocol (SFTP), Secure Sockets Layer (SSL), Transport Layer Security (TLS) , Session Layer protocols (SLP), Presentation Layer protocols (PLP), Post Office Protocol (POP), Advanced Program-to-Program Communication (APPC), Advanced Message Queuing Protocol (AMQP), Coherent File Distribution Protocol (CFDP), Constrained Application Protocol (CoAP), Data Distribution Service (DDS), Endpoint Handle space Redundancy Protocol (ENRP), User Information Protocol (UIP), File Transfer Access and Management (FTAM), Packet-Based Multimedia Communications System (H.323), Internet Relay Chat Protocol (IRCP), Lightweight Directory Access Protocol (LDAP), Line Printer Daemon Protocol (LPD), Multipurpose Internet Mail Extensions (MIME), Secure/Multipurpose Internet Mail Extensions (S/MIME), Network File System (NFS), Network Information Service (NIS), Network News Transfer Protocol (NNTP), National Transportation Communications for Intelligent Transportation System Protocol (NTCIP), Network Time Protocol (NTP), Peer Name Resolution Protocol (PNRP), Remote Desktop Protocol (RDP), Reliable Event Logging Protocol (RELP), Routing Information Protocol (RIP), Remote Login in UNIX Systems (Rlogin), Remote Procedure Call (RPC), Real Time Messaging Protocol (RTMP), Real Time Publish Subscribe (RTPS), Real Time Streaming Protocol (RTSP), Session Announcement Protocol (SAP), Session Description Protocol (SDP), Session Initiation Protocol (SIP), Service Location Protocol (SLP), Server Message Block (SMB), Simple Network Time Protocol (SNTP), Secure SMS Messaging Protocol (SSMS), Transaction Capabilities Application Part (TCAP), Tabular Data Stream (TDS), Time Stamp Protocol (TSP), Virtual Terminal Protocol (VTP), Remote Directory Access Protocol, Message Handling Service Protocol, Directory Access Protocol (DAP), and Extensible Messaging and Presence Protocol (XMPP).

4. The system of claim 1, wherein the retrieved information fields comprise one X-Forwarded-For (XFF), X-Forwarded-Proto, Front-End-HTTPs, X-Wap-Profile, X-Requested-With, SIP Address, and X-Remote-Address.

5. The system of claim 1, wherein the one or more applicable security rules are configured to block the application layer packet, allow the application layer packet, or implement a configuration setting on the application layer packet.

6. The system of claim 1, wherein the one or more applicable security rules cause a single sign-on process to be performed, which authenticates the identified end user and authorizes the identified end user to access a particular resource of the network.

7. The system of claim 6, further comprising a user authentication proxy logically interposed between the end user and a web server for performing the single sign-on process.

8. A method for implementing application layer security comprising:
receiving, by a network appliance associated with a network of an enterprise, a packet;
determining, by the network appliance, an application type with which the packet is associated;
extracting, by the network appliance, one or more information fields from application layer information within the packet that are indicative of an identity of an end user of the enterprise with which the packet is associated;
identifying, by the network appliance, one or more applicable security rules based on the application type and the one or more information fields; and
applying, by the network appliance, the one or more applicable security rules to the packet.

9. The method of claim 8, wherein a plurality of security rules from which the one or more applicable security rules are selected are stored in a database operatively coupled with the network appliance.

10. The method of claim 8, wherein the application type comprises one or more of HyperText Transfer Protocol (HTTP), Session Initiation Protocol (SIP), Simple Mail Transfer Protocol (SMTP), Real-time Transport Protocol (RTP), Structured Query Language (SQL), Real-Time Publish-Subscribe Protocol (RTPS), Secure Shell protocol (SSH), File transfer Protocol (FTP), Simple Mail Transfer Protocol (SMTP) , HTTPS, Secure File Transfer Protocol (SFTP), Secure Sockets Layer (SSL), Transport Layer Security (TLS) , Session Layer protocols (SLP), Presentation Layer protocols (PLP), Post Office Protocol (POP), Advanced Program-to-Program Communication (APPC), Advanced Message Queuing Protocol (AMQP), Coherent File Distribution Protocol (CFDP), Constrained Application Protocol (CoAP), Data Distribution Service (DDS), End-point Handle space Redundancy Protocol (ENRP), User Information Protocol (UIP), File Transfer Access and Management (FTAM), Packet-Based Multimedia Communications System (H.323), Internet Relay Chat Protocol (IRCP), Lightweight Directory Access Protocol (LDAP), Line Printer Daemon Protocol (LPD), Multipurpose Internet Mail Extensions (MIME), Secure/Multipurpose Internet Mail Extensions (S/MIME), Network File System (NFS), Network Information Service (NIS), Network News Transfer Protocol (NNTP), National Transportation Communications for Intelligent Transportation System Protocol (NTCIP), Network Time Protocol (NTP), Peer Name Resolution Protocol (PNRP), Remote Desktop Protocol (RDP), Reliable Event Logging Protocol (RELP), Routing Information Protocol (RIP), Remote Login in UNIX Systems (Rlogin), Remote Procedure Call (RPC), Real Time Messaging Protocol (RTMP), Real Time Publish Subscribe (RTPS), Real Time Streaming Protocol (RTSP), Session Announcement Protocol (SAP), Session Description Protocol (SDP), Session Initiation Protocol (SIP), Service Location Protocol (SLP), Server Message Block (SMB), Simple Network Time Protocol (SNTP), Secure SMS Messaging Protocol (SSMS), Transaction Capabilities Application Part (TCAP), Tabular Data Stream (TDS), Time Stamp Protocol (TSP), Virtual Terminal Protocol (VTP), Remote Directory Access Protocol, Message Handling Service Protocol, Directory Access Protocol (DAP), and Extensible Messaging and Presence Protocol (XMPP).

11. The method of claim 8, wherein the one or more information fields comprise one or more of an X-Forwarded-For (XFF) field, an X-Forwarded-Proto field, a Front-End-HTTPs field, an X-Wap-Profile field, an X-Requested-With field, and an X-Remote-Address field.

12. The method of claim 8, wherein the one or more applicable security rules are configured to block the packet, allow the packet or implement a configuration setting on the packet.

13. The method of claim 8, wherein the one or more applicable security rules cause a single sign-on process to be performed, which authenticates the identified end user and authorizes the identified end user to access a particular resource of the network.

14. The method of claim 13, wherein the single sign-on process is performed by a user authentication proxy logically interposed between the end user and the network appliance.

15. A non-transitory computer-readable storage medium embodying a set of instructions, which when executed by one or more processors of a network appliance, cause the one or more processors to perform a method comprising:
receiving a packet originated within a network of an enterprise;
determining an application type with which the packet is associated;
extracting one or more information fields from application layer information within the packet that are indicative of an identity of an end user of the enterprise with which the packet is associated;
identifying one or more applicable security rules based on the application type and the one or more information fields; and
applying the one or more applicable security rules to the packet.

16. The non-transitory computer-readable storage medium of claim 15, wherein a plurality of security rules from which the one or more applicable security rules are selected are stored in a database operatively coupled with the network appliance.

17. The non-transitory computer-readable storage medium of claim 15, wherein the one or more information fields comprise one or more of an X-Forwarded-For (XFF) field, an X-Forwarded-Proto field, a Front-End-HTTPs field, an X-Wap-Profile field, an X-Requested-With field, and an X-Remote-Address field.

18. The non-transitory computer-readable storage medium of claim 15, wherein the one or more applicable security rules are configured to block the packet, allow the packet or implement a configuration setting on the packet.

19. The non-transitory computer-readable storage medium of claim 15, wherein the one or more applicable security rules cause a single sign-on process to be performed, which authenticates the identified end user and authorizes the identified end user to access a particular resource of the network.

20. The non-transitory computer-readable storage medium of claim 19, wherein the single sign-on process is performed by a user authentication proxy logically interposed between the end user and the network appliance.

* * * * *